United States Patent
Odaka et al.

(10) Patent No.: US 10,260,912 B2
(45) Date of Patent: Apr. 16, 2019

(54) ENCODER THAT DETECTS INFILTRATION OF LIQUID BY LIGHT

(71) Applicant: FANUC CORPORATION, Yamanashi (JP)

(72) Inventors: Shunichi Odaka, Yamanashi (JP); Hirosato Yoshida, Yamanashi (JP); Keisuke Imai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 34 days.

(21) Appl. No.: 15/472,536

(22) Filed: Mar. 29, 2017

(65) Prior Publication Data

US 2017/0284834 A1    Oct. 5, 2017

(30) Foreign Application Priority Data

Apr. 1, 2016    (JP) ................. 2016-074237

(51) Int. Cl.
   *G01D 5/347*    (2006.01)
   *G01M 11/08*    (2006.01)
   *G01M 11/02*    (2006.01)

(52) U.S. Cl.
   CPC ....... *G01D 5/3473* (2013.01); *G01D 5/34715* (2013.01); *G01M 11/0278* (2013.01); *G01M 11/0285* (2013.01); *G01M 11/081* (2013.01)

(58) Field of Classification Search
   CPC ............ G01D 5/3473; G01D 5/34715; G01M 11/0285; G01M 11/0278; G01M 11/081

USPC .......................................... 250/231.1–231.18
See application file for complete search history.

(56) References Cited

U.S. PATENT DOCUMENTS

| | | | | |
|---|---|---|---|---|
| 4,604,521 A | * | 8/1986 | Takekoshi ............. | H03M 1/308 250/231.17 |
| 6,927,388 B2 | * | 8/2005 | Imai ................... | G01D 5/34707 250/231.13 |
| 7,014,289 B1 | * | 3/2006 | Matsuda ................ | B41J 2/2135 347/19 |
| 7,103,210 B2 | * | 9/2006 | Tanaka .................. | G03F 9/7088 250/492.22 |
| 7,579,829 B1 | | 8/2009 | Wong et al. | |
| 2009/0122323 A1 | | 5/2009 | Schneider | |
| 2009/0321621 A1 | * | 12/2009 | Yoshida ............... | G01D 5/3473 250/231.13 |
| 2012/0133701 A1 | * | 5/2012 | Nakata ..................... | B41J 19/20 347/19 |

FOREIGN PATENT DOCUMENTS

| | | |
|---|---|---|
| JP | 58-2613 | 1/1983 |
| JP | 61-233308 | 10/1986 |
| JP | 2005-91023 | 4/2005 |
| JP | 2009-115801 | 5/2009 |
| JP | 2010-44055 | 2/2010 |
| JP | 2012-215587 | 11/2012 |

* cited by examiner

*Primary Examiner* — Seung C Sohn
(74) *Attorney, Agent, or Firm* — Wenderoth, Lind & Ponack, L.L.P.

(57) ABSTRACT

An optical encoder of the present invention includes a light-receiving element unit 5, moving slit 2 and fixed slit 3. The light-receiving element unit 5 includes a pattern 5B for detecting infiltration of liquid.

2 Claims, 5 Drawing Sheets

ENCODER THAT DETECTS INFILTRATION OF LIQUID BY LIGHT

This application is based on and claims the benefit of priority from Japanese Patent Application No. 2016-074237, filed on 1 Apr. 2016, the content of which is incorporated herein by reference.

BACKGROUND OF THE INVENTION

Field of the Invention

The present invention relates to an encoder that detects infiltration of liquid by light.

Related Art

In the field of industrial machinery, various encoders are used as sensors that detect the position of an electric motor or driven equipment that is driven by an electric motor, and in particularly, optical-type encoders are widely employed with the object of detecting the rotational position of a drive shaft of a rotary motor.

When liquid adheres inside of an optical encoder, this liquid has a negative influence on the precision, reliability and lifespan, even in a minute amount. In other words, if liquid adheres to the optical path of the optical-type encoder, the light that should be received will distort or be absorbed, or another optical signal will be contaminated. As a result thereof, the signal is disturbed, and in the case of an encoder for position detection, the detection precision will drop, incorrect positional information will be transmitted, transmit a signal of incorrect signal level, and will cause a great negative influence on feedback control or system operation.

Conventionally, a configuration reducing the influence of liquid by arranging a conductive coil on one side of a gear or gear train, and detecting the gear, etc. electromagnetically (refer to Patent Document 1), a configuration that covers a scanning unit of an optical encoder with a conductive, transparent cover to prevent electromagnetic noise and the infiltration of liquid (refer to Patent Document 2), a configuration in which liquid having lubricity for transmitting light is filled between a moving scale and fixed scale, or between a main scale and light-receiving part of an optical encoder (refer to Patent Document 3), and a configuration that detects an abnormality in a photoelectric-type encoder by comparing a detection signal of a photoelectric converter with reference voltages at the positive side and negative side thereof, and comparing the phases thereof (refer to Patent Document 4) have been known.

Patent Document 1: Japanese Unexamined Patent Application, Publication No. 2010-044055
Patent Document 2: Japanese Unexamined Patent Application, Publication No. 2009-115801
Patent Document 3: Japanese Unexamined Patent Application, Publication No. 2005-091023
Patent Document 4: Japanese Unexamined Patent Application, Publication No. S58-002613

SUMMARY OF THE INVENTION

However, the technology of Patent Document 1 has no function of detecting the adherence of liquid. Although the technology of Patent Document 2 prevents the infiltration of liquid, when liquid infiltrates in an unlikely event, there is no means for detecting and coping with this. Although the technology of Patent Document 3 uses liquid that transmits liquid, no consideration is made for the liquid infiltrating. There is no disclosure in Patent Document 4 about a pattern for detecting the infiltration of liquid to the light-receiving element or rotating slit, and the technology of Patent Document 4 is not able to detect if the position signal actually becomes abnormal.

In the above way, although schemes for preventing the infiltration of liquid and configurations that detect abnormality of the position signal are seen in conventional encoders, they are not simple configurations that actively detect the infiltration of liquid, and actively warn and counteract prior to the function as an encoder system being lost or declining.

The present invention has an object of detecting liquid that has infiltrated and adhered to an encoder at an early stage to solve the problems of the conventional technology.

According to a first aspect of the present invention, in an optical encoder including a light-receiving element unit (for example, the light-receiving element unit 5, 15 described later), a moving slit (for example, the moving slit 2, 12, 22 described later) and a fixed slit (for example, the fixed slit 3, 13, 23 described later), the light-receiving element unit includes a pattern (for example, the pattern for detecting infiltration of liquid 5B, 15B described later) for detecting infiltration of a liquid.

According to a second aspect of the present invention, in the optical encoder as described in the first aspect, at least one among the moving slit (for example, the moving slit 2, 12, 22 described later) and the fixed slit (for example, the fixed slit 3, 13, 23 described later) may include a pattern (for example, the pattern for detecting infiltration of liquid 12B, 13B, 22B, 23B described later) for detecting infiltration of a liquid.

According to a third aspect of the present invention, in the optical encoder as described in the first or second aspect, the pattern for detecting infiltration of a liquid may be a groove (for example, the groove 20, 30 described later).

According to a fourth aspect of the present invention, in the optical encoder as described in the first or second aspect, the pattern for detecting infiltration of a liquid may be fine concavities and convexities (for example, the fine concavities/convexities 40 described later).

According to a fifth aspect of the present invention, in the optical encoder as described in the first or second aspect, the pattern for detecting infiltration of a liquid may be a moisture absorbing material (for example, the moisture absorbing material 50 described later).

According to a sixth aspect of the present invention, in the optical encoder as described in any one of the first to fifth aspects, the pattern for detecting infiltration of a liquid may be disposed at an outer side of a slit part (for example, the slit part 2A, 3A, 12A, 13A described later) or a position detection pattern (for example, the position detection pattern 5A, 15A described later) for detecting the position on the slit part.

According to the present invention, it is possible to detect liquid that has infiltrated and adhered to an encoder prior to the position signal becoming abnormal. The mechanism and function of detecting liquid that has infiltrated and adhered to the encoder can prevent or abate efficiency decline, accidents, etc. due to functional loss or functional decline of the encoder system in advance.

DETAILED DESCRIPTION OF THE INVENTION

An optical encoder will be explained. Herein, an optical encoder of rotary type is used for convenience of explanation.

First Embodiment

Referencing FIGS. 1 to 4C, a first embodiment of the present invention will be explained. The optical encoder of the first embodiment is an optical sensor that detects the rotational position of a rotating shaft connected to a rotating body, and in particular, the optical encoder of the present embodiment is a transmission-type optical encoder arranged so that a light projection unit and a light-receiving element unit are opposing via a plurality of slits.

Figure 1:
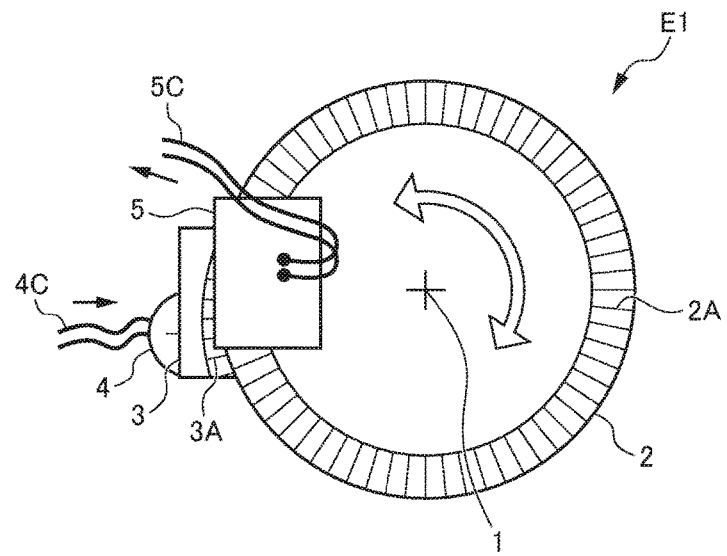
FIG. 1 is a plan view showing the configuration of an optical-type encoder according to a first embodiment.
Figure 2:
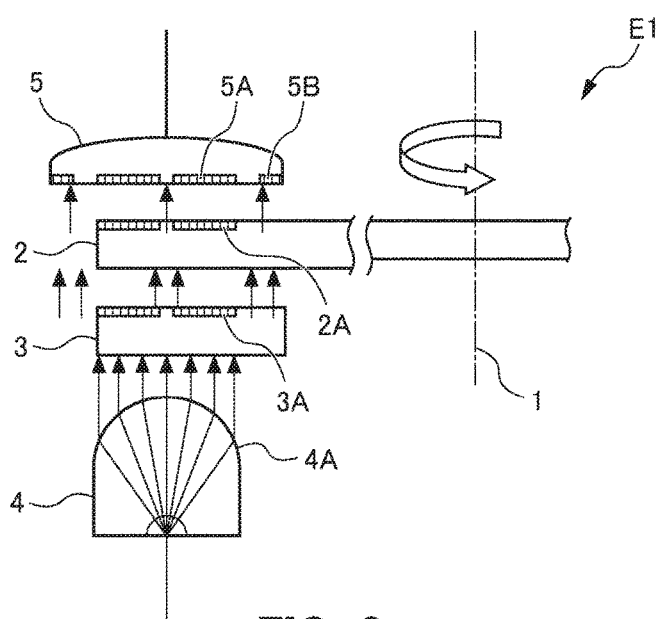
FIG. 2 is a cross-sectional view showing the configuration of an optical-type encoder according to the first embodiment.

FIG. 1 is a plan view with an optical encoder E1 seen from a light-receiving element unit side, as an example of the present embodiment. FIG. 2 is a cross-sectional view along a face including a rotating shaft line, light projection unit, light-receiving element unit, etc. of the optical encoder E1.

As in FIG. 1, the optical encoder E1 of the present embodiment includes a rotating shaft 1 connected to a drive shaft of a rotating motor, and a rotated body (not illustrated) that is rotationally driven by the rotating motor, etc., a disk-shaped moving slit 2 that is connected so as to intersect the rotating shaft 1, a fixed slit 3, a light projection unit 4, and a light-receiving element unit 5. The moving slit 2 includes a radial slit part 2a that is installed at fixed intervals in the circumferential direction, in order to output a sine wave corresponding to the rotation angle thereof. The fixed slit 3 includes a slit part 3A for restricting the width of light incident on the slit disk, and clarifying ON/OFF of light.

As shown in FIG. 2, the light projection unit 4, fixed slit 3, moving slit 2, and light-receiving element unit 5 are arranged in this order. The fixed slit 3 is arranged to oppose one principal surface side of the moving slit 2, and the light-receiving element unit 5 is arranged to oppose the other principal surface side. It should be noted that FIG. 1 schematically illustrates the optical encoder E1, and the positional relationships of the light projection unit 4, fixed slit 3, moving slit 2 and light-receiving element unit 5 are depicted to be shifted for easy understanding.

The light projection unit 4 functions as a light source radiating light towards the fixed slit 3 and moving slit 2, for example, and is configured by a light emitting diode (LED) or laser diode (LD). The light irradiated from the light projection unit 4 has a wavelength in the range from infrared to visible light, for example. The light-receiving element unit 5, for example, is a phototransistor or photodiode, and has a detection range or detection sensitivity corresponding to the wavelength of light irradiated from the light projection unit 4.

The moving slit 2 and fixed slit 3 are formed by materials such as metal, glass, and resin. In the case of a metal material being used, the moving slit 2 and fixed slit 3 are formed by performing etching on a plate of metal such as stainless steel, for example. In the case of a glass material being used, the moving slit 2 and fixed slit 3 are configured by a glass plate on which a metal thin film has been deposited, for example. In the case of using a synthetic resin material, for example, if the moving slit 2 and fixed slit 3 are configured by resin plates on which a reflector in a V-shaped groove or the like is formed, it is easy to mold into a desired shape, and it is possible to reduce the production cost due to the material being relatively low cost.

Figures 4A, 4B, 4C:
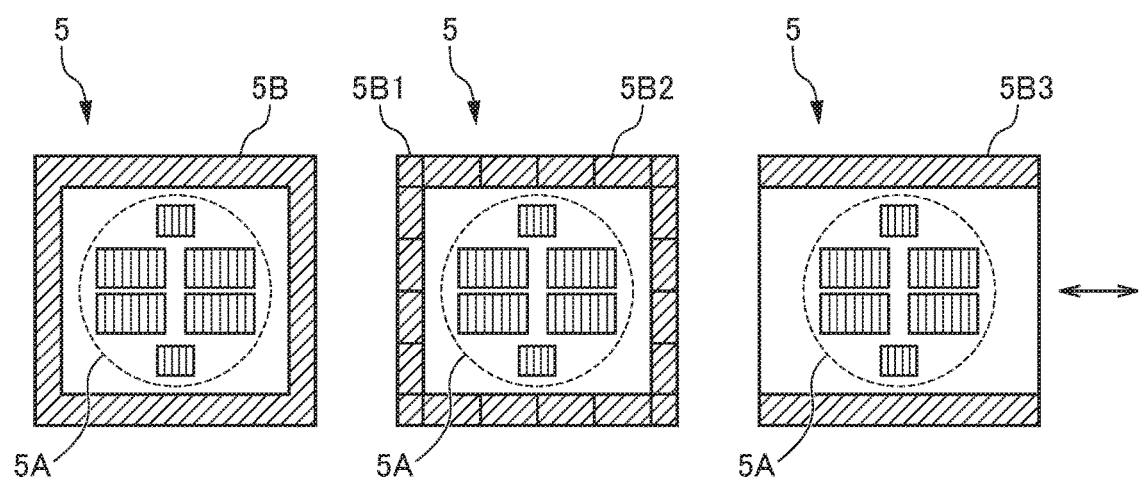
FIGS. 4A to 4C are views showing a detection pattern example of the light-receiving element unit equipped with a pattern for detecting the infiltration of liquid.

In the optical encoder E1 of the present embodiment, the light of the light projection unit 4 projects light and shade onto the light-receiving element unit 5 through the fixed slit 3 and moving slit 2 in this arrangement, the light-receiving element unit 5 outputs a sine-wave signal to a signal processing unit (not illustrated), and detects the positional information. In FIGS. 1, 4C and 5C are lead wires, and the arrows represent the path of the electrical supply—light projection, light-receiving—detection signal. As shown in FIG. 2, parallel light irradiated from the light projection unit 4 penetrates the slit part 3A of the fixed slit 3 and the slit part 2A of the moving slit 2, and is detected by the position detection pattern 5A of the light-receiving element unit 5. A lens 4A of the required size is provided to the light projection unit 4, and parallel light that is substantially parallel is irradiated.

Figure 3:
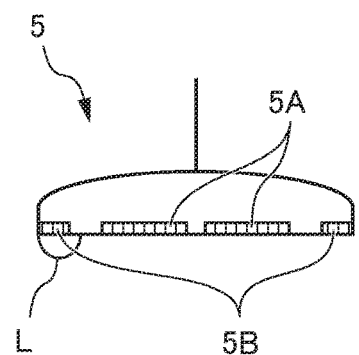
FIG. 3 is a view showing a state of liquid adhering to a light-receiving element unit of the first embodiment.

FIG. 3 shows a state of liquid L adhering to the light-receiving element unit 5 of the first embodiment. The light-receiving element unit 5 includes a position detection pattern 5A, and a pattern 5B for detecting infiltration of liquid. The pattern 5B for detecting the infiltration of liquid is the arrangement pattern of light-receiving bodies that detect the infiltration of liquid. FIGS. 4A to 4C are schematic views with the light-receiving element unit 5 of the optical encoder E1 of the first embodiment seen from the side of the light projection unit 4, and show the planar shape of the position detection pattern 5A and the pattern 5B for detecting the infiltration of liquid.

As shown in FIG. 2, the light irradiated from the light projection unit 4 also reaches the pattern 5B for detecting the infiltration of liquid of the light-receiving element unit 5. If liquid adheres on the pattern 5B for detecting the infiltration of liquid of the light-receiving element unit 5, the intensity on the pattern 5B for detecting the infiltration of liquid will change or the wavelength will change, due to liquid absorbing or distorting the light. The signal processing unit (not illustrated) detects the infiltration of liquid and displays an alarm or warning if the signal of the light-receiving element unit 5 changes from a reference value. In the example of FIG. 2, at more outwards in the radial direction than the slit parts 3A, 2A of the fixed slit 3 and moving slit 2, the irradiation light reaches the pattern 5B for detecting the infiltration of liquid of the light-receiving element unit 5 as is, without passing through these slits; however, it is not limited thereto. The irradiation light may arrive through at least one thereof. In addition, the irradiation light may reach at the inner side in the radial direction of the slit part 3A of the fixed slit 3, without passing through the fixed slit 3.

(Detection Pattern Example)

In FIGS. 4A to 4C, in the light-receiving element unit 5 of each embodiment of the present invention, the respective detection pattern examples 1 to 3 of the pattern 5B for detecting the infiltration of liquid are shown. The detection pattern examples 1 to 3 are light-receiving patterns in which the light-receiving bodies for detecting light are arranged.

(Detection Pattern Example)

FIG. 4A is a schematic view of detection pattern example 1 of the pattern 5B for detecting infiltration of liquid in the light-receiving element unit 5. As shown in the same figure, whereas the position detection pattern 5A is included at the central part of the light-receiving element unit 5, the pattern 5B for detecting the infiltration of liquid is included at the peripheral part of the light-receiving element unit 5. The liquid thereby adheres to the pattern 5B for detecting the infiltration of liquid prior to reaching the position detection pattern 5A. In the present example, the light-receiving element unit 5 is rectangular in a plan view seen from the side of the light projection unit 4. The pattern 5B for detecting the infiltration of liquid is formed in substantially the same width at four sides of the light-receiving element unit 5. The intensity detected by the pattern 5B for detecting the infiltration of liquid is the sum of a fixed intensity at which the light-receiving body receives light at the top/bottom sides seen in FIG. 4A, and a changing intensity that is received at the left/right sides.

FIG. 4B is a schematic view of detection pattern example 2 of the pattern 5B for detecting the infiltration of liquid in the light-receiving element unit 5. In detection pattern example 2, the pattern 5B for detecting the infiltration of liquid is split into detection patterns of a plurality of light-receiving bodies, and it is possible to detect in further detail the infiltration direction, amount, etc. of liquid. As in FIG. 4B, the pattern 5B for detecting the infiltration of liquid is split into detection patterns of corner parts 5B1 and side parts 5B2 thereof, and each of the side parts 5B2 is further split into detection patterns of a plurality of portions. It is possible to detect a region in which liquid has infiltrated by detecting the intensity in each or every predetermined group, corresponding to the corner parts 5B1 and side parts 5B2 thus split. For example, in the case of the detection pattern of the corner part 5B1 detecting infiltration of liquid, it is determined that liquid infiltrated from the direction of this corner part 5B1. In addition, it is possible to determine the amount of liquid according to how many detection patterns among the four detection patterns (for example, four on the right side viewed in FIG. 4B) of the side parts 5B2 of the pattern 5B for detecting the infiltration of liquid have detected the liquid.

FIG. 4C is a schematic view of detection pattern example 3 of the pattern 5B for detecting the infiltration of liquid in the light-receiving element unit 5. In detection pattern example 3, the pattern 5B for detecting the infiltration of liquid is not arranged in the light-receiving element unit 5 in regions in the moving direction (arrow direction in FIG. 4C) of the moving slit 2. In other words, the pattern 5B3 for detecting the infiltration of liquid is arranged only on sides of a near side and far side to the rotating shaft 1, disconnected from the moving region of the slit part 2A of the moving slit 2. Since the change in light and shade for the position detection pattern 5A will thereby not influence the pattern 5B3 for detecting the infiltration of liquid, the load of signal processing on the signal processing unit is reduced. As a result, a size reduction in the signal processing unit, cost reduction, and increased precision for liquid infiltration detection become possible. Viewed in FIG. 4C, the upper/lower two detection patterns 5B3 may be one light-reception signal, or may be separate light-reception signals.

According to the present embodiment, liquid infiltrating and adhering to the encoder can be detected prior to the position signal becoming abnormal. Since it is completed without adding a new sensor for detecting the infiltration of liquid as in conventional technology, it is effective in a size reduction and cost reduction.

Second Embodiment

Figure 5:
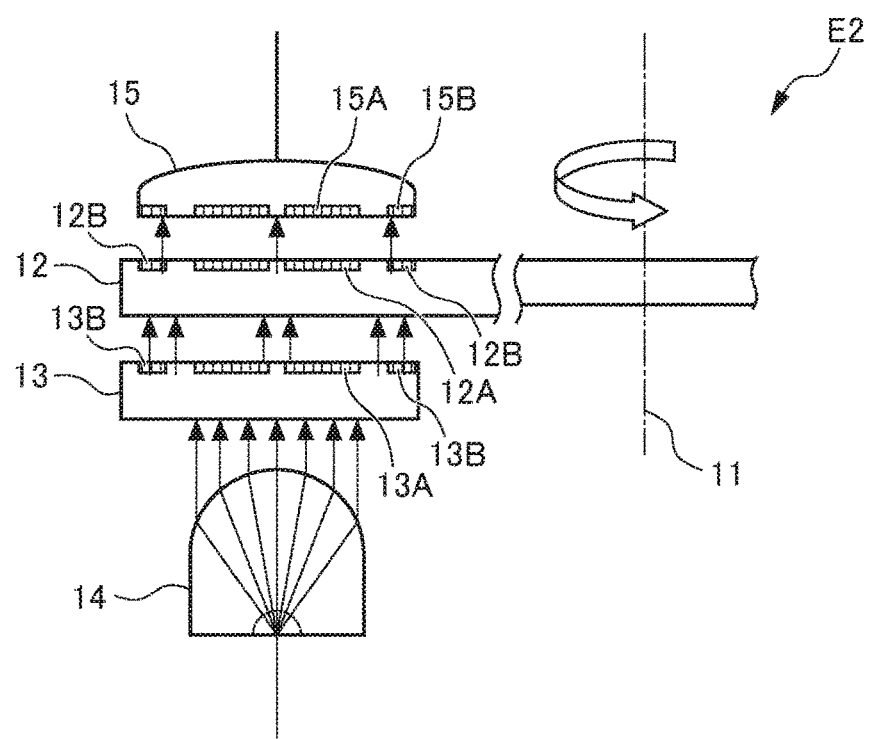
FIG. 5 is a cross-sectional view showing the configuration of an optical-type encoder according to a second embodiment.

A second embodiment of the present invention will be explained by referencing FIG. 5. As shown in FIG. 5, an optical encoder E2 of the present embodiment includes a rotating shaft 11, moving slit 12, fixed slit 13, light projection unit 14 and light-receiving element unit 15, similarly to the first embodiment. In the optical encoder E2 of the present embodiment, the light-receiving element unit 15 includes a position detection pattern 15A and a pattern 15B for detecting the infiltration of liquid. The moving slit 12 and fixed slit 13 respectively include the radial slit parts 12A, 13A. It is possible to apply detection pattern examples 1 to 3 (FIGS. 4A to 4C) explained in the section of the first embodiment, to the pattern 15B for detecting the infiltration of liquid in the light-receiving element unit 15.

In the present embodiment, at least either of the moving slit 12 and fixed slit 13 includes a pattern 12B, 13B for detecting the infiltration of liquid. The pattern 12B for detecting the infiltration of liquid provided to the moving slit 12, for example, is formed in a ring shape viewed in a plan, at the outer side and inner side of the slit part 12A. In the case of the liquid L infiltrating and adhering on either of the patterns 12B for detecting the infiltration of liquid on the outer side and inner side, when the adhering position thereof enters the region of the pattern 15B for detecting the infiltration of liquid of the light-receiving element unit 15 by way of rotation of the moving slit 12, this liquid L is detected by the pattern 15B for detecting the infiltration of liquid of the light-receiving element unit 15. The pattern 13B for detecting the infiltration of liquid provided to the fixed slit 13, for example, is formed in a circular arc viewed in a plane, at the outer side and inner side in a radial direction of the slit part 13A.

If liquid adheres at the periphery of at least either slit part 12A, 13A of the moving slit 12 and fixed slit 13, the intensity or wavelength received by the pattern 15B for detecting the infiltration of liquid in the light-receiving element unit 15 will change according to the liquid adhering to the moving slit 12 and/or fixed slit 13. It is thereby possible to detect the infiltration of liquid.

In the above way, at least either of the moving slit 12 and fixed slit 13 includes the pattern 12B, 13B for detecting the infiltration of liquid at the inner side and outer side in the radial direction of the slit parts 12A, 13A. It is thereby possible to detect the infiltration of liquid prior to the liquid L reaching the slit parts 12A, 13A of the moving slit 12 and fixed slit 13.

In the present embodiment, the pattern 15B for detecting the infiltration of liquid is provided at a plurality of locations other than the light-receiving element unit 15. It is thereby possible to detect the infiltration of liquid more reliably compared to the first embodiment.

In FIG. 5 illustrates a case of both the moving slit 12 and fixed slit 13 including a pattern for detecting the infiltration of liquid; however, it is not limited thereto. As another arrangement example, it may be an arrangement in which only the moving slit 12 includes the pattern 12B for detecting the infiltration of liquid (not illustrated), or an arrangement in which only the fixed slit 13 includes the pattern 13B for detecting the infiltration of liquid (not illustrated).

In the case of both the moving slit 12 and fixed slit 13 including the patterns 12A, 13B for detecting the infiltration of liquid, it is possible to detect the infiltration of liquid more reliably compared to a case of only the moving slit 12 including the pattern 12B for detecting the infiltration of liquid, or a case of only the fixed slit 13 including the pattern 13B for detecting the infiltration of liquid.

(Pattern Structure Example)

Hereinafter, pattern structure examples 1 to 4 of patterns for detecting the infiltration of liquid used in the respective embodiments of the present invention will be explained using FIGS. 6 to 9, respectively. These pattern structure examples 1 to 4 are applied to the patterns 12B, 13B that detect the infiltration of liquid provided to the moving slit 12 and fixed slit 13.

Figure 6:
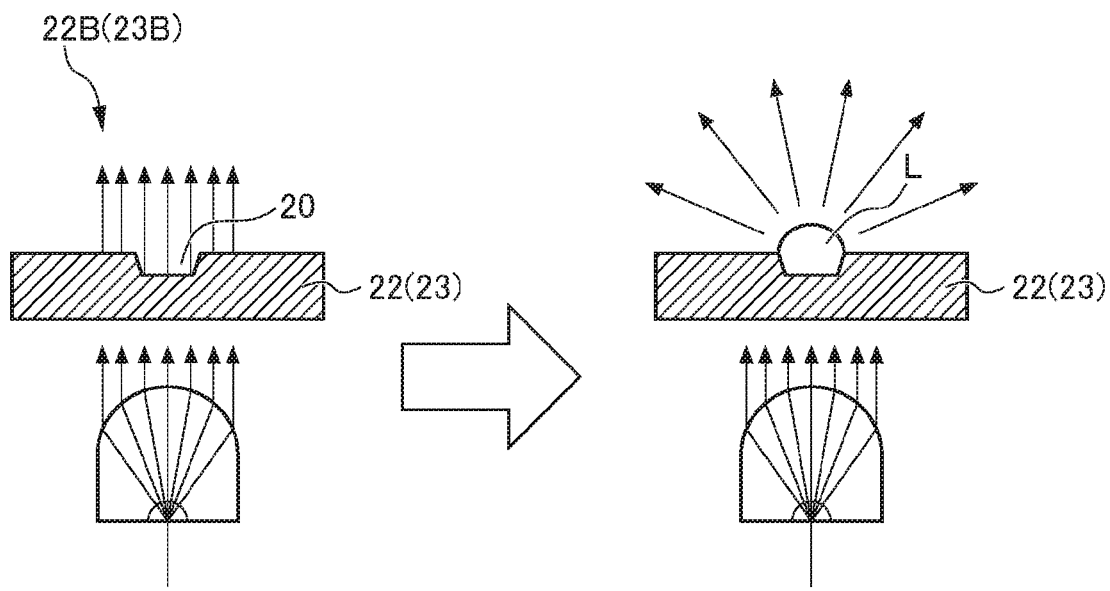
FIG. 6 is a view showing a pattern structure example 1 of a pattern for detecting infiltration of liquid.
Figure 7:
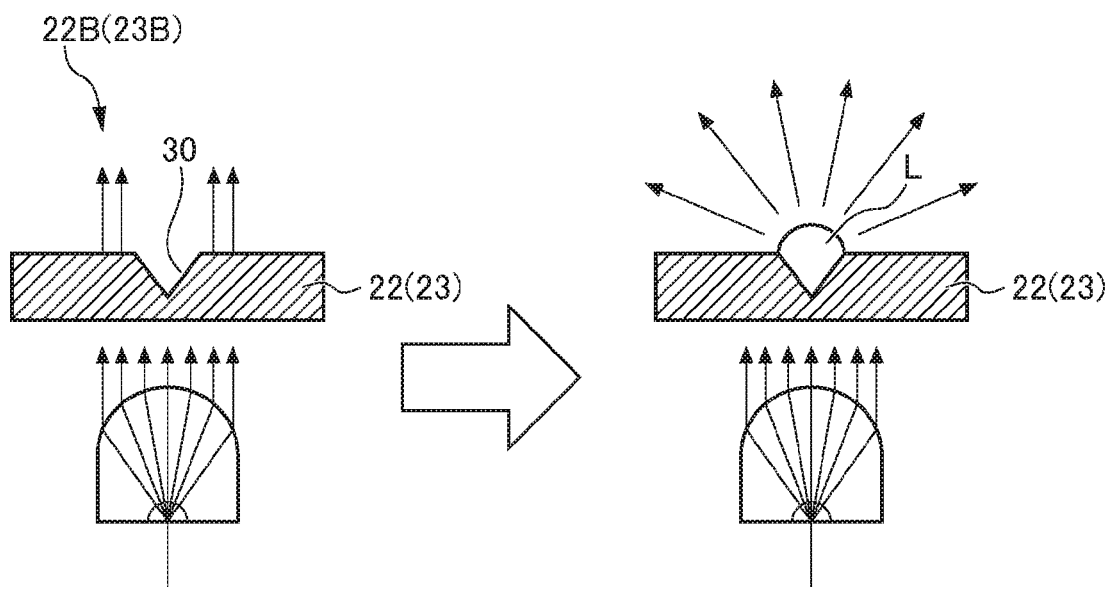
FIG. 7 is a view showing a pattern structure example 2 of a pattern for detecting infiltration of liquid.

FIGS. 6 and 7 respectively show the pattern structure examples 1 and 2 of the pattern 22B (23B) for detecting the infiltration of liquid in the moving slit 22 (or fixed slit 23) used in the respective embodiments of the present invention. As shown in FIGS. 6 and 7, the grooves 20, 30 are each formed as patterns 22B (23B) for detecting the infiltration of liquid, in the moving slit 22 (or fixed slit 23).

Since liquid L tends to collect in the grooves 20, 30 due to surface tension, it is possible to detect the infiltration of the liquid L more reliably, by using the grooves 20, 30 as the patterns 22B (23B) for detecting the infiltration of liquid. In the case of molding the moving slit 22 and fixed slit 23 by injection molding of a synthetic resin or the like, it is possible to particularly inexpensively produce the patterns from the grooves 20, 30.

FIG. 6 shows pattern structure example 1, and the pattern 22B (23B) for detecting the infiltration of liquid is formed by grooves with flat bottoms in a cross-sectional view. By the liquid L adhering to the flat-bottomed groove 20, the light that would have gone straight upwards in the same figure in the case of there being no liquid L is reduced by distortion or is blocked. As the shape of the flat-bottomed groove 20, a cross-section rectangular, inverse trapezoidal, plurality of grooves, etc. is used.

FIG. 1 shows pattern structure example 2, and the pattern 22B (23B) for detecting the infiltration of liquid is formed by grooves having a V-shaped bottom. By the liquid L adhering in the groove 30 having a V-shaped bottom, the light which had so far been reflected and distorted at the boundary of the V-shaped bottom and not reached the pattern for detecting the infiltration of liquid then penetrates in the upward direction in the figure due to the adherence of the liquid L. The inclination angle of the V-shaped groove 30 is designed with the refractive index of the constituent material of the slit, etc. as conditions.

Figure 8:
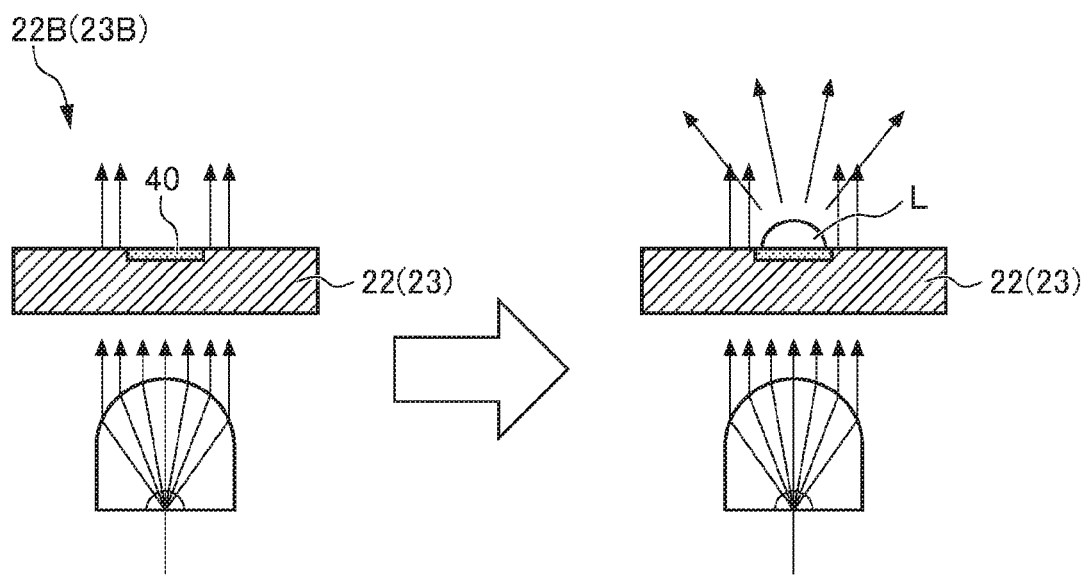
FIG. 8 is a view showing a pattern structure example 3 of a pattern for detecting infiltration of liquid.

FIG. 8 shows pattern structure example 3, and the surface of the detection pattern 22B (23B) for detecting the infiltration of liquid is formed in fine concavities/convexities 40.

The fine concavities/convexities 40 are frosted glass-like fineness, and the light is normally blocked by diffuse reflection of the irregular surface. However, the light that had been diffusely reflected will penetrate by the concavities/convexities becoming flat in the case of the liquid L adhering, whereby the adherence of the liquid L is detected. The fine concavities/convexities can be inexpensively produced by conducting machining on the moving slit or fixed slit. The fine concavities/convexities may be formed by injection molding or embossing. In addition, the shape of the fine concavities/convexities may be constant, or may be random.

Figure 9:
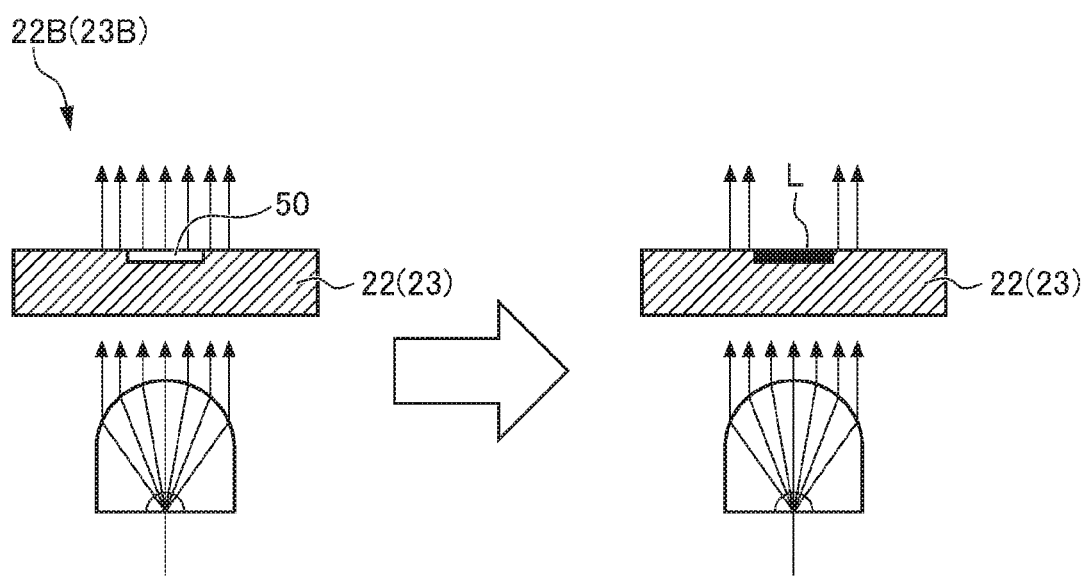
FIG. 9 is a view showing a pattern structure example 4 of a pattern for detecting infiltration of liquid.

FIG. 9 shows pattern structure example 4, and a moisture absorbing material 50 for which the transmittance and wavelength of light changes according to the moisture absorbing amount is used as the detection pattern 22B (23B) for detecting the infiltration of liquid. By using the moisture absorbing material 50, it is possible to detect the infiltration of the liquid L more reliably. The moisture absorbing material 50 may be formed on the surface of the moving slit 22 or fixed slit 23, or may be provided in a recessed part. As the moisture absorbing material 50, it is possible to use a high-molecular compound including cobalt chloride, organic pigment, or the like for which the transmittance or wavelength of light changes according to moisture absorbance.

In the above explanation of the pattern structure examples, although explained with examples in which the pattern structure examples 1 to 4 are applied to the moving slit 12 and/or fixed slit 13, it is not limited thereto. These pattern structure examples can also be formed on the patterns 5B, 15B for detecting the infiltration of liquid of the light-receiving element unit 15. In this case, a sheet-like body or layer including a pattern structure of grooves or the like is placed or laminated on the respective detection pattern examples according to the light-receiving bodies shown in FIGS. 4A to 4C.

According to the respective embodiments of the present invention, the following effects are exerted. Liquid that has infiltrated and adhered on the encoder can be detected prior to the position signal becoming abnormal. The mechanism and function of detecting liquid that has infiltrated and adhered to the encoder can prevent or abate efficiency decline, accidents, etc. due to functional loss or functional decline of the encoder system in advance. Since it is completed without adding a new sensor for detecting the infiltration of liquid as in conventional technology, it is effective in a size reduction and cost reduction. In addition, whereas infiltration of liquid is detected after the position signal has become abnormal with the conventional technology, the present invention detects the infiltration of liquid by a dedicated pattern for detecting the infiltration of liquid. Consequently, since it is actually possible to prevent the position signal from becoming abnormal before it happens, the present embodiment has higher reliably and is safer than the conventional technology. The pattern for detecting the infiltration of liquid is provided to the peripheral part of the light-receiving element unit. According to this fact, the liquid will adhere to the pattern for detecting the infiltration of liquid prior to reaching the position detection pattern, and thus it is possible to detect the infiltration of liquid. By splitting the pattern for detecting the infiltration of liquid in the light-receiving element unit, it is possible to detect the infiltration direction, amount, etc. of liquid. By the pattern for detecting the infiltration of liquid not being arranged in the movement direction of the moving slit of the light-receiving element unit, the load of signal processing on the signal processing unit is reduced. As a result, a size reduction in the signal processing unit, cost reduction, and increased precision for liquid infiltration detection become possible.

By the pattern for detecting the infiltration of liquid being provided at a plurality of locations other than the light-receiving element unit, it is possible to detect the infiltration of liquid more reliably. By making the pattern for detecting the infiltration of liquid in the moving slit and/or fixed light in a groove shape, it is possible to detect the infiltration of liquid more reliably. By making the detection pattern for detecting the infiltration of liquid in the moving slit and/or fixed slit in the shape of fine concavities/convexities, it is possible to produce inexpensively. By using a moisture absorbing material as the pattern for detecting the infiltration of liquid in the moving slit and/or fixed slit, it is possible to detect the infiltration of liquid more reliably.

It should be noted that the present invention is not to be limited to each of the embodiments or examples, and that modifications and improvements in a scope in which the object of the present invention can be achieved are also included in the present invention. Although a rotary-type optical encoder has been explained in the embodiments of the present invention, it may be a linear-type encoder. In addition, it may be an encoder of any type such as a reflection-type optical encoder. In addition, the pattern for detecting the infiltration of liquid in the light-receiving element unit is not to be limited to the forms of the respective embodiments and, for example, the planar form of the light-receiving element unit can be made circular, elliptical or polygonal. In addition, the detection pattern shape of the pattern for detecting the infiltration of liquid may be made dissimilar in the length and area according to the positions of the side parts. The patterns for detecting the infiltration of liquid in the moving slit or fixed slit have been explained as being provided on one surface thereof; however, it is not limited thereto, and may be provided to the other surface, both surfaces, and end faces. The pattern for detecting the infiltration of liquid in the moving slit and fixed slit may be provided to only one of an inner side or outer side in the radial direction. The pattern for detecting the infiltration of liquid provided on the fixed slit is not limited to a circular arc and may be linear, and may be arranged at the surroundings of the fixed slit and be a fan shape or quadrilateral shape. The light detected by the position detection pattern of the light-receiving element unit and the pattern 5B for detecting the infiltration of liquid may be outputted as a shared received light signal. A material that controls the wettability of the liquid may be used in the pattern for detecting the infiltration of liquid.

EXPLANATION OF REFERENCE NUMERALS

E1 optical encoder
E2 optical encoder
L liquid
1, 11 rotating shaft
2, 12, 22 moving slit
3, 13, 23 fixed slit
4, 14 light projection unit
5, 15 light-receiving element unit
2A, 3A, 12A, 13A slit part
5A, 15A position detection pattern
5B, 12B, 13B, 15B, 22B, 23B pattern for detecting infiltration of liquid
20, 30 groove
40 fine concavities/convexities
50 moisture absorbing material

What is claimed is:

1. An optical encoder including a light-receiving element unit, a moving slit and a fixed slit,
    wherein the light-receiving element unit comprises a first pattern for detecting infiltration of a liquid, and
    wherein the first pattern for detecting infiltration of the liquid is disposed at an outer side of a position detection pattern for detecting a position on a first slit part.

2. The optical encoder according to claim 1,
    wherein at least one among the moving slit and the fixed slit includes a second pattern for detecting infiltration of the liquid, and
    wherein the second pattern for detecting infiltration of the liquid in the moving slit or the fixed slit is disposed at an outer side of a second slit part.

* * * * *